United States Patent
Xue et al.

(10) Patent No.: US 11,646,276 B2
(45) Date of Patent: May 9, 2023

(54) DETECTION CIRCUIT FOR LASER FAULT INJECTION ATTACK ON CHIP AND SECURITY CHIP

(71) Applicant: SHENZHEN GOODIX TECHNOLOGY CO., LTD., Shenzhen (CN)

(72) Inventors: Jianfeng Xue, Shenzhen (CN); Yunning Li, Shenzhen (CN); Yuan Su, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/468,221

(22) Filed: Sep. 7, 2021

(65) Prior Publication Data
US 2022/0045021 A1 Feb. 10, 2022

Related U.S. Application Data

(63) Continuation of application No. PCT/CN2020/107804, filed on Aug. 7, 2020.

(51) Int. Cl.
*H01L 23/00* (2006.01)
*G01J 1/46* (2006.01)
(Continued)

(52) U.S. Cl.
CPC .......... *H01L 23/576* (2013.01); *G01J 1/4257* (2013.01); *G01J 1/46* (2013.01);
(Continued)

(58) Field of Classification Search
CPC ........ H01L 23/576; H01L 23/552; G01J 1/46; G01J 2001/446; G01J 1/4257; G06F 21/72; G06F 21/75; G06F 21/71; G06F 21/755
See application file for complete search history.

(56) References Cited

U.S. PATENT DOCUMENTS

| | | | |
|---|---|---|---|
| 5,481,118 | A | 1/1996 | Tew |
| 7,554,073 | B2 | 6/2009 | Lum et al. |

(Continued)

FOREIGN PATENT DOCUMENTS

| | | |
|---|---|---|
| CN | 202034982 U | 11/2011 |
| CN | 202372617 U | 8/2012 |

(Continued)

OTHER PUBLICATIONS

International Search Report for PCT/CN2020/107804.
(Continued)

*Primary Examiner* — Jennifer D Bennett
(74) *Attorney, Agent, or Firm* — W&G Law Group

(57) ABSTRACT

Embodiments of the present disclosure provide a detection circuit for a laser fault injection attack on a chip and a security chip. The detection circuit includes a first capacitor, a second capacitor, a first switch, a second switch, a photosensitive element, a first NMOS transistor, and a second NMOS transistor. A drain of the first NMOS transistor is configured to output a first voltage signal, and a drain of the second NMOS transistor is configured to output a second voltage signal. The first voltage signal and the second voltage signal are configured to indicate that the chip is attacked by laser fault injection, thereby realizing detection of the laser fault injection attack, and ensuring the robustness and security of the chips.

20 Claims, 10 Drawing Sheets

(51) Int. Cl.
  *G06F 21/75* (2013.01)
  *G06F 21/72* (2013.01)
  *H01L 23/552* (2006.01)
  *G01J 1/44* (2006.01)
  *G01J 1/42* (2006.01)
  *H01L 27/144* (2006.01)

(52) U.S. Cl.
  CPC .............. *G06F 21/72* (2013.01); *G06F 21/75* (2013.01); *G06F 21/755* (2017.08); *H01L 23/552* (2013.01); *G01J 2001/446* (2013.01); *H01L 27/1443* (2013.01)

(56) References Cited

U.S. PATENT DOCUMENTS

| | | | |
|---|---|---|---|
| 2010/0301873 A1* | 12/2010 | Nobukata | H04L 9/004 356/213 |
| 2011/0193616 A1* | 8/2011 | Amanuma | H03K 3/42 327/514 |
| 2013/0200371 A1 | 8/2013 | Marinet et al. | |
| 2016/0225725 A1 | 8/2016 | Kim et al. | |
| 2019/0050702 A1* | 2/2019 | Ko | H04L 9/3263 |

FOREIGN PATENT DOCUMENTS

| | | | | |
|---|---|---|---|---|
| CN | 105184194 A | | 12/2015 | |
| CN | 105258795 A | | 1/2016 | |
| CN | 105844153 A | | 8/2016 | |
| CN | 106407844 A | | 2/2017 | |
| CN | 106768319 A | | 5/2017 | |
| CN | 107403798 A | * | 11/2017 | ............. H01L 27/02 |
| CN | 107403798 A | | 11/2017 | |
| CN | 109492437 A | | 3/2019 | |
| EP | 1429227 A2 | | 6/2004 | |
| EP | 2259487 A1 | | 8/2010 | |
| EP | 2282279 A1 | | 9/2011 | |

OTHER PUBLICATIONS

Supplementary European Search Report for European App. No. 20922472.4 dated May 13, 2022.
Notice of Grant of Invention Patent for Chinese App. No. 2020080018323.7 dated May 12, 2022.
"Protection design of low-cost eSIM chip against laser fault injection attack," Electronic Component and Information Technology, vol. 3, No. 11 (Nov. 2019).

* cited by examiner

DETECTION CIRCUIT FOR LASER FAULT INJECTION ATTACK ON CHIP AND SECURITY CHIP

CROSS REFERENCE TO RELATED APPLICATIONS

The present application is a continuation of international application No. PCT/CN2020/107804, filed on Aug. 7, 2020, which is hereby incorporated by reference in its entirety.

TECHNICAL FIELD

The present disclosure relates to the field of chip security technology, and in particular to a detection circuit for a laser fault injection attack on a chip and a security chip.

BACKGROUND

In order to achieve the purposes, such as stealing data stored in a chip and affecting the normal operation of the chip, hackers may attack the chip. In particular, security chips are widely used in scenarios that require high data reliability, such as identification, key data storage, and financial fields, and generally store confidential data, and therefore security chips, as the key targets, are often attacked by hackers. Attackers generally inject faults into the chip through attacking methods, make the working state of the chip wrong, and then obtain the confidential data stored in the chip.

The laser fault injection attack is a semi-invasive attack method commonly used by attackers. Attackers use laser pulses to attack the chip from the front side or back side, resulting in incorrect timing or abnormal flipping of the circuit, which in turn changes the storage content and affects data transmission and normal operation of an encryption module of the chip. In order to ensure the robustness and security of the chip and a device that the chip belongs to, it is necessary to detect the laser fault injection attack on the chip in time and provide an alarm, so that the chip or the device that the chip belongs to can deal with the laser fault injection attack in time.

SUMMARY

The present disclosure provides a detection circuit for a laser fault injection attack on a chip and a security chip, which can detect laser fault injection attacks on a chip, such as a security chip, and improve the robustness and security of the chip.

In a first aspect, the present disclosure provides a detection circuit for a laser fault injection attack on a chip, and the detection circuit is disposed in the chip. The detection circuit includes a first capacitor, a second capacitor, a first switch, a second switch, a photosensitive element, a first NMOS transistor, and a second NMOS transistor. The first switch includes a control terminal configured to receive a first clock signal for controlling a turning-on state and a turning-off state of the first switch, a first terminal connected to a supply voltage, and a second terminal grounded through the first capacitor. The second switch includes a control terminal configured to receive a second clock signal for controlling a turning-on state and a turning-off state of the second switch, a first terminal connected to the supply voltage, and a second terminal grounded through the second capacitor. The first NMOS transistor includes a drain connected to the second terminal of the first switch and configured to output a first voltage signal, a source connected to the photosensitive element, and a gate connected to the second terminal of the second switch. The second NMOS transistor includes a drain connected to the second terminal of the second switch and configured to output a second voltage signal, a source connected to the photosensitive element, and a gate connected to the second terminal of the first switch; and the first voltage signal and the second voltage signal are configured to indicate the chip is attacked by laser fault injection.

The above detection circuit for the laser fault injection attack can detect the laser fault injection attack on the chip, such as a security chip, and improve the robustness and security of the chip.

In an embodiment, the first clock signal and the second clock signal have a same frequency and a same phase.

In an embodiment, the first clock signal and the second clock signal have opposite phases.

In an embodiment, the first switch is turned on when the first clock signal is at a high level, and is turned off when the clock signal is at a low level; and the second switch is turned on when the second clock signal is at a high level, and is turned off when the second clock signal is at a low level.

In an embodiment, the first switch includes a first inverter and a first PMOS transistor, the first PMOS transistor includes a gate, a drain serving as the first terminal of the first switch, and a source serving as the second terminal of the first switch, and the first inverter includes an input terminal serving as the control terminal of the first switch, and an output terminal connected to the gate of the first PMOS transistor.

In an embodiment, the second switch includes a second inverter and a second PMOS transistor, the second PMOS transistor includes a gate, a drain serving as the first terminal of the second switch, and a source serving as the second terminal of the second switch, and the second inverter includes an input terminal serving as the control terminal of the second switch, and an output terminal connected to the gate of the second PMOS transistor.

In an embodiment, the first switch is turned on when the first clock signal is at a low level, and is turned off when the first clock signal is at a high level; and the second switch is turned on when the second clock signal is at a low level, and is turned off when the second clock signal is at a high level.

In an embodiment, the first switch includes a third PMOS transistor, and the third PMOS transistor includes a gate serving as the control terminal of the first switch, a drain serving as the first terminal of the first switch, and a source serving as the second terminal of the first switch.

In an embodiment, the second switch includes a fourth PMOS transistor, and the fourth PMOS transistor includes a gate serving as the control terminal of the second switch, a drain serving as the first terminal of the second switch, and a source serving as the second terminal of the second switch.

In an embodiment, the first switch is turned on when the first clock signal is at a low level, and is turned off when the first clock signal is at a high level; and the second switch is turned on when the second clock signal is at a high level, and is turned off when the second clock signal is at a low level.

In an embodiment, the first switch includes a third PMOS transistor, and the third PMOS transistor includes a gate serving as the control terminal of the first switch, a drain serving as the first terminal of the first switch, and a source serving as the second terminal of the first switch.

In an embodiment, the second switch includes a second inverter and a second PMOS transistor, the second PMOS transistor includes a gate, a drain serving as the first terminal of the second switch, and a source serving as the second terminal of the second switch, and the second inverter includes an input terminal serving as the control terminal of the second switch, an output terminal connected to the gate of the second PMOS transistor.

In an embodiment, the first switch is turned on when the first clock signal is at a high level, and is turned off when the first clock signal is at a low level; the second switch is turned on when the second clock signal is at a low level, and is turned off when the second clock signal is at a high level.

In an embodiment, the first switch includes a first inverter and a first PMOS transistor, the first PMOS transistor includes a gate, a drain serving as the first terminal of the first switch, and a source serving as the second terminal of the first switch, and the first inverter includes an input terminal serving as the control terminal of the first switch, and an output terminal connected to the gate of the first PMOS transistor.

In an embodiment, the second switch includes a fourth PMOS transistor including a gate serving as the control terminal of the second switch, a drain serving as the first terminal of the second switch, and a source serving as the second terminal of the second switch.

In an embodiment, the photosensitive element is a photodiode.

In an embodiment, the detection circuit further includes a signal processing circuit, configured to output a processing signal based on the first voltage signal and the second voltage signal, wherein the processing signal is configured to control states of other circuits in the chip.

In a second aspect, embodiments of the present disclosure provide a security chip, the security chip includes a storage circuit and the detection circuit for the laser fault injection attack described in the first aspect, and the first voltage signal and the second voltage signal are configured to control removal of contents of the storage circuit.

BRIEF DESCRIPTION OF DRAWINGS

In order to more clearly explain technical solutions of embodiments of the present disclosure, the drawings needed in the embodiments will be briefly introduced below. Apparently, the drawings in the following description are only some embodiments of the present disclosure. For those of ordinary skill in the art, without creative work, other drawings can be obtained from these drawings.

DESCRIPTION OF EMBODIMENTS

Some terms used in implementations of this disclosure are merely used to explain specific embodiments of this disclosure, but are not intended to limit this disclosure.

Embodiments of the present disclosure provide a detection circuit for a laser fault injection attack on a chip, which can detect the laser fault injection attacks on a chip, such as a security chip, and improve the robustness and security of the chip. The implementation of the detection circuit for a laser fault injection attack in the embodiments of the present disclosure will be exemplarily described below.

Figure 1:
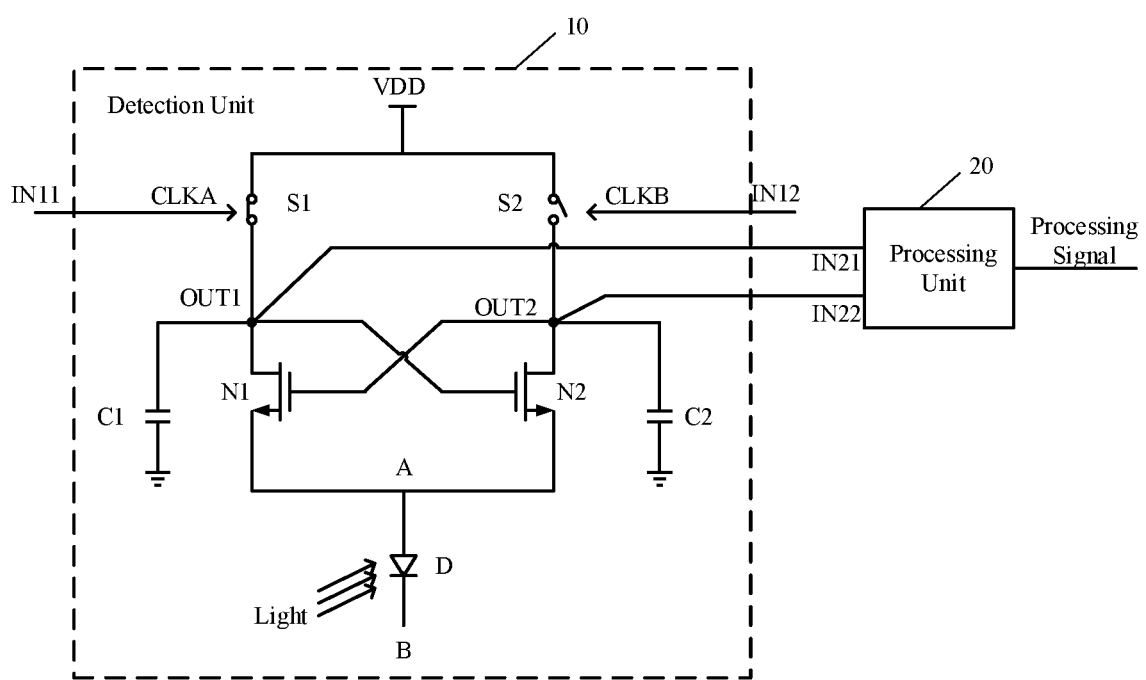
FIG. 1 is a structural diagram of a detection circuit for a laser fault injection attack according to an embodiment of the present disclosure.

FIG. 1 is a structural diagram of a detection circuit for a laser fault injection attack according to an embodiment of the present disclosure. As shown in FIG. 1, the detection circuit for the laser fault injection attack includes a detection unit 10 and a processing unit 20.

A first input terminal IN11 of the detection unit 10 receives a first clock signal CLKA, a second input terminal IN12 of the detection unit 10 receives a second clock signal CLKB. In an embodiment, the first clock signal CLKA and the second clock signal CLKB are a same signal, that is, when the first clock signal CLKA is at a high level, the second clock signal CLKB is also at the high level, and when the first clock signal CLKA is at a low level, the second clock signal CLKB is also at the low level. As long as the first clock signal CLKA and the second clock signal CLKB have a same frequency and a same phase, the signal amplitudes of the two clock signals are not limited. A first output terminal OUT1 of the detection unit 10 is configured to output a first voltage signal, and a second output terminal OUT2 is configured to output a second voltage signal.

A first input terminal IN21 of the processing unit 20 is connected to the first output terminal OUT1 of the detection unit 10, and is configured to receive the first voltage signal. A second input terminal N22 of the processing unit 20 is connected to the second output terminal OUT2 of the detection 10, and is configured to receive the second voltage signal. The processing unit 20 outputs a processing signal when the first voltage signal received from the first input terminal IN21 is at the low level and/or when the second voltage signal received from the second input terminal IN22 is at the low level. That is, as long as at least one of the first voltage signal received from the first input terminal IN21 or the second voltage signal received from the second input terminal IN22 is at the low level, the processing unit 20 outputs the processing signal, and the processing signal is configured to control states of other circuits in the chip where the laser fault injection attack detection circuit is disposed. For example, the processing unit 20 may output the processing signal to a processor of the chip where the detection circuit for the laser fault injection attack is disposed, and the processor executes predetermined processing for the laser fault injection attacks, such as interrupt or chip reset; or the processing unit 20 can output the processing signal to a storage circuit of the chip, and the storage circuit removes stored contents.

It should be noted that the processing unit 20 in embodiments of the present disclosure is an optional unit. If the detection circuit for the laser fault injection attack only includes the detection unit, the detection circuit for the laser fault injection attack in the embodiment of the present disclosure can indicate whether the chip where the detection circuit for the laser fault injection attack is disposed is attacked by the laser fault injection attack based on the first voltage signal and the second voltage signal that are outputted by the detection unit, and the first voltage signal and the second voltage signal are configured to control the states of other circuits in the chip where the detection circuit for the laser fault injection attack is disposed. For example, the first voltage signal and the second voltage signal that are outputted by the detection unit can be directly outputted to the processor of the chip where the detection circuit for the laser fault injection attack is disposed, and the processor executes predetermined processing against the laser fault injection attacks, such as interrupt or chip reset when at least one of the first voltage signal or the second voltage signal is at the low level; or the first voltage signal and the second voltage signal that are outputted by the detection unit can be directly outputted to the storage circuit of the chip, and the storage circuit removes the stored contents when at least one of the first voltage signal/or the second voltage signal is at the low level.

The detection unit 10 includes a first switch S1, a second switch S2, a first negative channel metal oxide semiconductor (NMOS) transistor N1, a second NMOS transistor N2, a first capacitor C1, a second capacitor C2, and a photosensitive element D. A control terminal of the first switch S1 serves as the first input terminal IN11 of the detection unit 10. A first terminal of the first switch S1 is connected to a supply voltage VDD. A second terminal of the first switch S1 is connected to a drain of the first NMOS transistor N1 and a gate of the second NMOS transistor N2, and is further grounded through the first capacitor C1. The second terminal of the first switch S1 also serves as the first output terminal OUT1 of the detection unit 10. A control terminal of the second switch S2 serves as the second input terminal IN12 of the detection unit 10. A first terminal of the second switch S2 is connected to the supply voltage VDD. A second terminal of the second switch S2 is connected to a drain of the second NMOS transistor N2 and a gate of the first NMOS transistor N1, and is further grounded through the second capacitor C2. The second terminal of the second switch S2 also serves as the second output terminal OUT2 of the detection unit 10. Both of a source of the first NMOS transistor N1 and a source of the second NMOS transistor N2 are connected to a first terminal of the photosensitive element D. A second terminal of the photosensitive element D is floated. In FIG. 1, the first terminal of the photosensitive element D is marked as point A, and the second terminal of the photosensitive element D is marked as point B.

The first clock signal CLKA received by the first input terminal IN11 of the detection unit 10 is configured to control the turning-on and turning-off states of the first switch S1, and the second clock signal CLKB received by the second input terminal IN12 of the detection unit 10 is configured to control the turning-on and turning-off states of the second switch S2.

In an embodiment, the photosensitive element D can be a photodiode, the first terminal of the photosensitive element is an anode of the photodiode, and the second terminal of the photosensitive element is a cathode of the photodiode.

Figure 2:
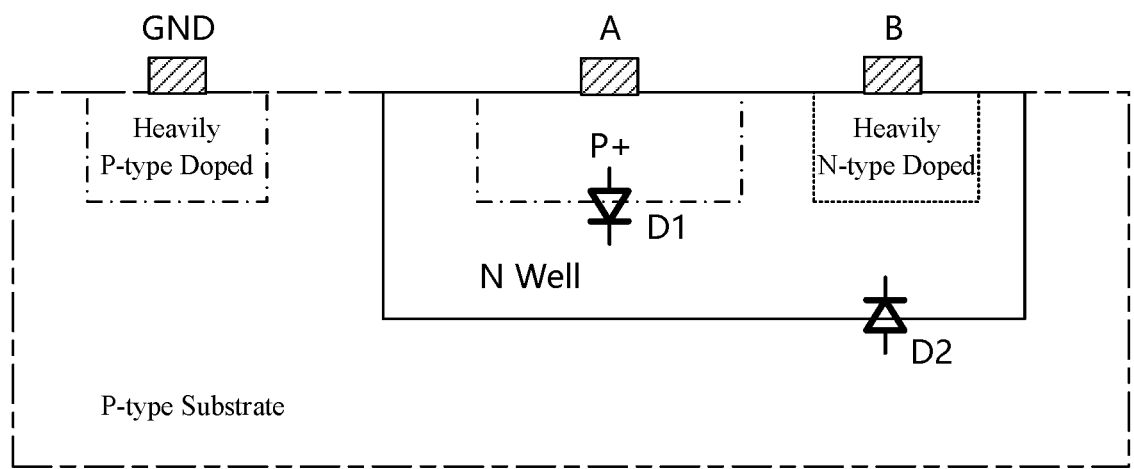
FIG. 2 showing structures between a point B of a detection circuit for a laser fault injection attack at and a substrate according to the present disclosure.

Next, the structural relationship between the point B and the substrate of the laser fault injection attack detection circuit when the point B is floated will be described. The substrate of the detection circuit for the laser fault injection attack is generally a part of the substrate of the chip to which the detection circuit for the laser fault injection attack belongs. As shown in FIG. 2, a reverse-biased PN junction D2 is provided between point B and the substrate. When attacked by the laser fault injection, the reverse-biased PN junction D2 will generate a current to the ground such that the charges stored at point A is discharged, and the voltage at point A is pulled down to ground when the current is large enough to discharge all stored charges.

The specific control logic of the controlling of the turning-on and turning-off states of the first switch S1 by the first clock signal CLKA is described hereafter. The first switch S1 is turned off when the first clock signal CLKA is at the low level and is turned on when the first clock signal CLKA is at the high level. The specific control logic of the controlling of the turning-on and turning-off states of the second switch S2 by the second clock signal CLKB is described hereafter. The second switch S2 is turned off when the second clock signal CLKB is at the low level and is turned on when the second clock signal CLKB is at the high level.

The working principle of the detection circuit for the laser fault injection attack shown in FIG. 1 is described.

First, the working principle of controlling the first switch S1 with the first clock signal CLKA in FIG. 1 will be described.

The first clock signal CLKA periodically inputs a high-level signal to the control terminal of the first switch S1, which can keep the voltage of the first output terminal OUT1 at the supply voltage VDD when there is no laser fault injection attack. The principle is as follows. When there is no laser fault injection attack, once the first capacitor C1 is connected to the supply voltage VDD and the charging is complete, the voltage of the first output terminal OUT1 is equal to the supply voltage VDD. However, if there is a leakage current in the circuit, the leakage current will cause discharging of the charges of the first capacitor C1, and the voltage of the first output terminal OUT1 decreases. If the first capacitor C1 is not charged for a long time, the leakage current can cause the voltage of the first output terminal OUT1 to decrease continuously. Once the voltage of the first output terminal OUT1 decreases below a preset first value, the signal outputted by the first output terminal OUT1 flips from a high level to a low level, the processing unit 20 receives the low-level signal and outputs the processing signal, and a false alarm occurs. Through periodically inputting a high-level signal to the control terminal of the first switch S1 by the first clock signal CLKA, the first switch S1 is turned on periodically, and the power supply periodically charges the first capacitor C1, which can replenish the charges of the first capacitor C1 discharged through the leakage current, thereby ensuring that when there is no laser fault injection attack, the voltage of the first output terminal OUT1 is always maintained at the supply voltage VDD, that is, being maintained at the high level, and avoiding false detection caused by leakage of the capacitor.

The controlling of the turning-on and turning-off states of the second switch S2 with the second clock signal CLKB in FIG. 1 is also based on the same principle. That is, the second clock signal CLKB is used for controlling the turning-on and turning-off states of the second switch S2, a high-level signal is periodically inputted to the second switch S2 to control the second switch S2 to be periodically turned on, and the power supply periodically charges the second capacitor C2 to replenish the charges of the second capacitor C2 that is discharged due to the leakage current, such that the voltage of the second output terminal OUT2 is maintained at the supply voltage VDD when there is no laser fault injection attack.

Hereinafter, combining the timing diagrams shown in FIG. 3 to FIG. 6, the working principle of the laser fault injection attack detection of the detection circuit for the laser fault injection attack shown in FIG. 1 will be explained.

A cycle of the first clock signal and a cycle the second clock signal in an embodiment of this disclosure are generally 1 μs to 100 μs, and a laser pulse signal is generally used to attack the chip in the laser fault injection attack. The laser pulse has a width in an order of ns, so the width of the laser pulse of the laser pulse signal is generally much smaller than the high-level width or low-level width in each cycle of the first clock signal and the second clock signal. Therefore, the laser pulse signal is generally located in the high-level duration or low-level duration in each cycle of the first clock signal and the second clock signal.

Figure 3:
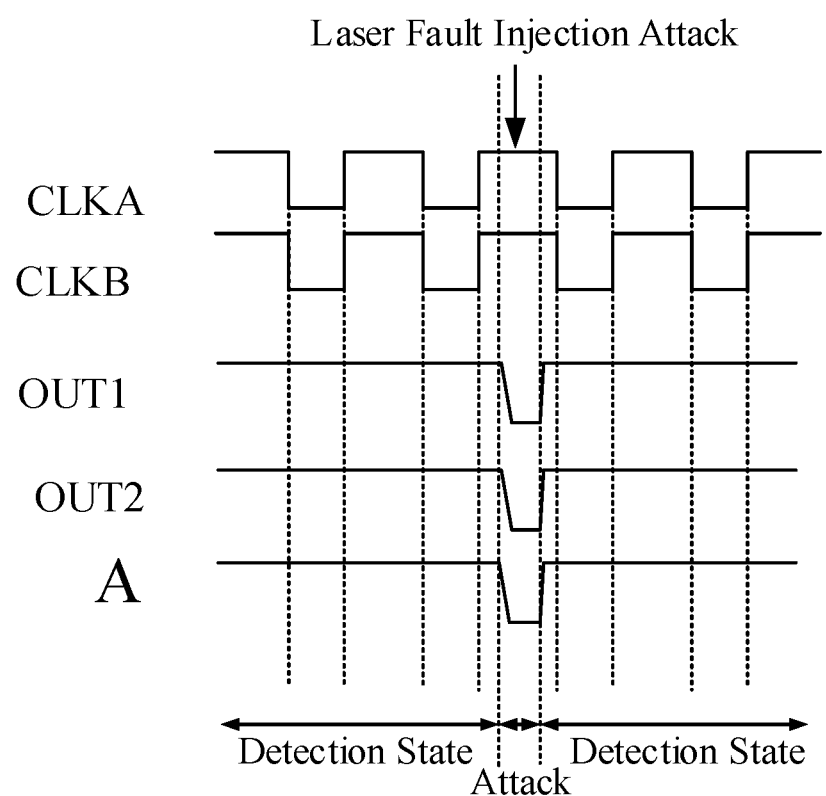
FIG. 3 to FIG. 6 illustrate timing diagrams of a working principle of a detection circuit for a laser fault injection attack shown in FIG. 1 according to the present disclosure.
Figure 4:
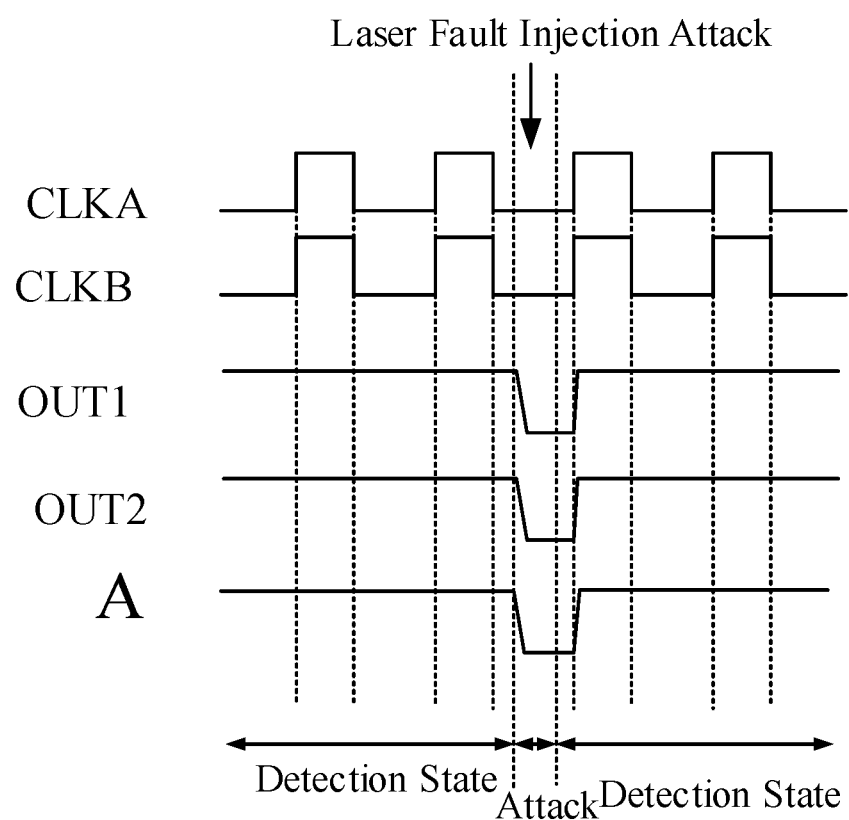

In an embodiment, the first clock signal CLKA and the second clock signal CLKB are a same signal, and accordingly, the timing diagrams of the detection circuit for the laser fault injection attack shown in FIG. 1 are shown in FIG. 3 and FIG. 4.

FIG. 3 shows the working timing diagram of the detection unit with an example in which when the first clock signal CLKA and the second clock signal CLKB are both at the high level, a laser fault injection attack occurs. FIG. 3 includes the timing diagrams of the voltage signals of the first output terminal OUT1, the second output terminal OUT2, and point A.

When the detection circuit is in the detection state and the laser fault injection attack does not occur, the first clock signal CLKA controls the first switch S1 to be periodically turned on by periodically inputting the high-level signal to the first switch S1, the power supply periodically charges the first capacitor C1, ensuring that the voltage of the first output terminal OUT1 is always maintained at the supply voltage VDD, that is, maintained at the high level. Similarly, the second clock signal CLKB controls the second switch S2 to be periodically turned on by periodically inputting the high-level signal to the second switch S2, the power supply periodically charges the second capacitor C2, ensuring that the voltage of the second output terminal OUT2 is always maintained at the supply voltage VDD, that is, maintained at the high level. When the voltage of the first output terminal OUT1 is maintained at the high level, the second NMOS transistor N2 is turned on. When the voltage of the second output terminal OUT2 is maintained at the high level, the first NMOS transistor N1 is turned on. Therefore, the voltage of point A is maintained at the high level.

Laser fault injection attack may occur in the high-level duration of the clock signal. At this time, the first clock signal CLKA is at the high level, the first switch S1 is turned on, the first output terminal OUT1 is connected to the supply voltage VDD, the second clock signal CLKB is at the high level, the second switch S2 is turned on, and the second output terminal OUT2 is connected to the supply voltage VDD. At this time, if a laser fault injection attack occurs, the photosensitive element D generates a photo generated current, and the charges at point A are discharged. Since the first NMOS transistor N1 and the second NMOS transistor N2 are turned on, the charges stored on the first capacitor C1 and the second capacitor C2 are respectively discharged through the turned-on first NMOS transistor N1 and the turned-on second NMOS transistor N2. However, the first clock signal CLKA is at the high level, and the first output terminal OUT1 is connected to the supply voltage VDD, so the first capacitor C1 is charged by the power supply when the first capacitor C1 is discharged. When a current by which the power supply charges the first capacitor C1 is smaller than a current by which the first capacitor C1 is discharged, the voltage of the first output terminal OUT1 will eventually be changed from the high level to the low level. Similarly, when a current by which the power supply charges the second capacitor C2 is smaller than a current by which the second capacitor C2 is discharged, the voltage of the second output terminal OUT2 will eventually be changed from the high level to the low level. After the laser fault injection attack ends, since the first clock signal CLKA and the second clock signal CLKB are both at the high level, the first output terminal OUT1 and the second output terminal OUT2 are connected to the supply voltage VDD, and the power supply charges the first capacitor C1 and the second capacitor C2, so the voltages of the first output terminal OUT1 and the second output terminal OUT2 are pulled up to the supply voltage VDD again, and become the high level.

FIG. 4 shows a working timing diagram of the detection unit with an example in which the laser fault injection attack occurs when the first clock signal CLKA and the second clock signal CLKB are both at the low level.

When the detection circuit is in the detection state and the laser fault injection attack does not occur, the first clock signal CLKA controls the first switch S1 to be periodically turned on by periodically inputting the high-level signal to the first switch S1, the power supply periodically charges the first capacitor C1 to ensure that the voltage of the first output terminal OUT1 is always maintained at the supply voltage VDD, that is, maintained at the high level. Similarly, the second clock signal CLKB controls the second switch S2 to be periodically turned on by periodically inputting the high-level signal to the second switch S2, the power supply periodically charges the second capacitor C2 to ensure that the voltage of the second output terminal OUT2 is always maintained at the supply voltage VDD, that is, maintained at the high level. When the voltage of the first output terminal OUT1 is maintained at the high level, the second NMOS transistor N2 is turned on. When the voltage of the second output terminal OUT2 is maintained at the high level, the first NMOS transistor N1 is turned on. Therefore, the voltage of point A is maintained at the high level.

Laser fault injection attack may occur in the low-level duration of the clock signal. At this time, the first clock signal CLKA is at the low level, the first switch S1 is turned off, the first output terminal OUT1 is floated and the voltage of the first output terminal OUT1 is the supply voltage VDD, the second clock signal CLKB is at the low level, the second switch S2 is turned off, the second output terminal OUT2 is floated, and the voltage of the second output terminal OUT2 is the supply voltage VDD. At this time, if a laser fault injection attack occurs, the photosensitive element D generates a photo generated current, and the charge at point A is discharged. Since the first NMOS transistor N1 and the second NMOS transistor N2 are turned on, the charges stored on the first capacitor C1 and the second capacitor C2 are respectively discharged through the turned-on first NMOS transistor N1 and the turned-on second NMOS transistor N2. The voltage of point A, the voltage of the first output terminal OUT1, the voltage of the second output terminal OUT2 are changed from the high level to the low level. After the laser fault injection attack ends, since the first clock signal CLKA and the second clock signal CLKB are both at the low level, the first output terminal OUT1 and the second output terminal OUT2 are both floated, and the voltages of the first output terminal OUT1 and the second output terminal OUT2 are still at the low level. When the first clock signal CLKA and the second clock signal CLKB change to the high level, the first switch S1 and the second switch S2 are turned on, the first output terminal OUT1 and the second output terminal OUT2 are connected to the supply voltage VDD, the power supply charges the first capacitor C1 and the second capacitor C2, and the voltages of the first output terminal OUT1 and the second output terminal OUT2 are pulled up to the supply voltage VDD again, and become the high level.

Based on FIG. 3 and FIG. 4 and the corresponding description content, the detection circuit for the laser fault injection attack in the embodiments of the present disclosure can detect the laser fault injection attack on the chip no matter whether the first clock signal CLKA and the second clock signal CLKB are at the high level or at the low level, which ensures the robustness and security of the chip.

Different from the above embodiment that the first clock signal CLKA and the second clock signal CLKB have a same phase, an embodiment of the present disclosure also provides another detection circuit for a laser fault injection attack. Based on the circuit structure shown in FIG. 1, the first clock signal CLKA and the second clock signal CLKB have opposite phases, that is, when the first clock signal CLKA is at a low level, the second clock signal CLKB is at a high level, and when the first clock signal CLKA is at a high level, the second clock signal CLKB is at a low level. As long as the first clock signal CLKA and the second clock signal CLKB have a same frequency and opposite phases, the signal amplitudes of the two clock signals are not limited. At this time, the timing diagram of the detection circuit for the laser fault injection attack in this embodiment is shown in FIG. 5 and FIG. 6.

Figure 5:
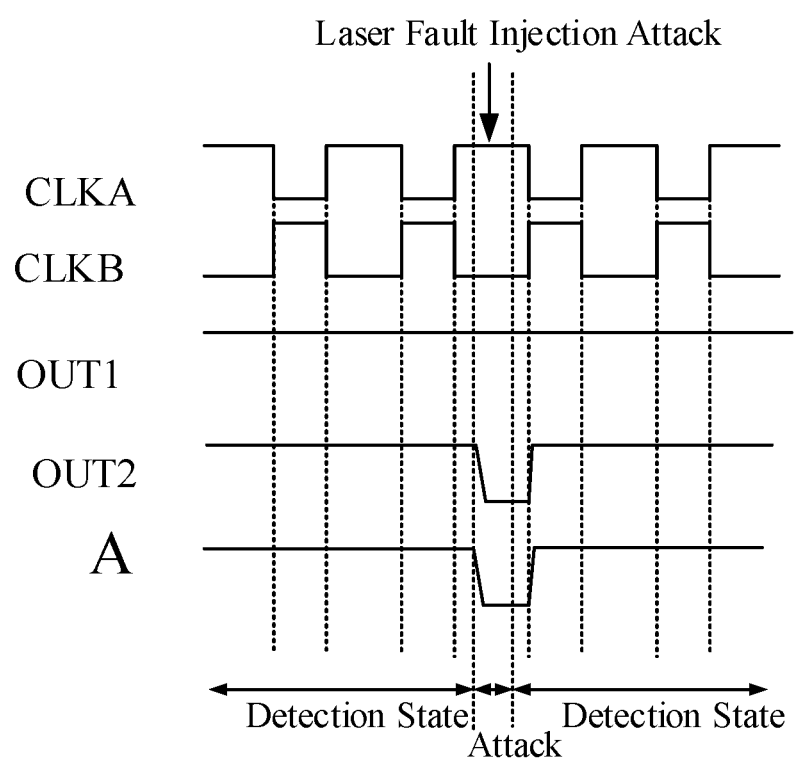
Figure 6:
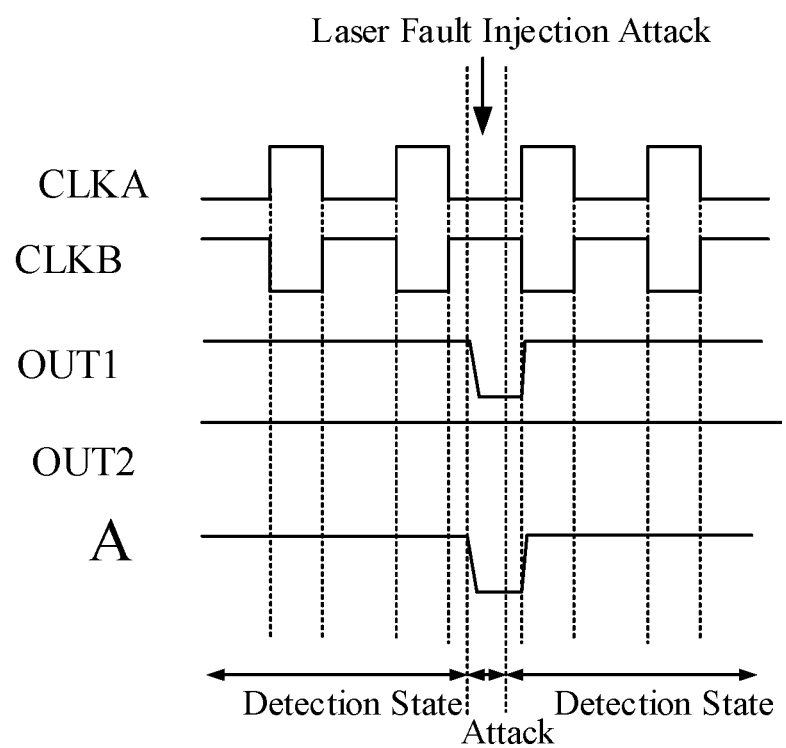

FIG. 5 shows the working timing diagram of the detection unit with an example in which the laser fault injection attack occurs when the first clock signal CLKA is at the high level and the second clock signal CLKB is at the low level.

When the detection circuit is in the detection state and the laser fault injection attack does not occur, the first clock signal CLKA controls the first switch S1 to be periodically turned on by periodically inputting the high-level signal to the first switch S1, the power supply periodically charges the first capacitor C1 to ensure that the voltage of the first output terminal OUT1 is always maintained at the supply voltage VDD, that is, maintained at the high level. Similarly, the second clock signal CLKB controls the second switch S2 to be periodically turned on by periodically inputting the high-level signal to the second switch S2, the power supply periodically charges the second capacitor C2 to ensure that the voltage of the second output terminal OUT2 is always maintained at the supply voltage VDD, that is, maintained at the high level. When the voltage of the first output terminal OUT1 is maintained at the high level, the second NMOS transistor N2 is turned on. When the voltage of the second output terminal OUT2 is maintained at the high level, the first NMOS transistor N1 is turned on. Therefore, the voltage of point A is maintained at the high level.

Laser fault injection attack may occur when the first clock signal CLKA is at the high level and the second clock signal CLKB is at the low level. At this time, the first clock signal CLKA is at the high level, the first switch S1 is turned on, the first output terminal OUT1 is connected to the supply voltage VDD, the second clock signal CLKB is at the low level, the second switch S2 is turned off, the second output terminal OUT2 is floated, and the voltage of the second output terminal OUT2 is the supply voltage VDD. At this time, if a laser fault injection attack occurs, the photosensitive element D generates a photo generated current, and the charge at point A is discharged. Since the first NMOS transistor N1 and the second NMOS transistor N2 are turned on, the charge on the first capacitor C1 is discharged through the turned-on first NMOS transistor N1, and the charge on the second capacitor C2 is discharged through the turned-on second NMOS transistor N2. However, the first clock signal CLKA is at the high level, the first output terminal OUT1 is connected to the supply voltage VDD, so when the first capacitor C1 is being discharged, it is also being charged by the power supply. When a current by which the power supply charges the first capacitor C1 is greater than a current by which the first capacitor C1 is discharged, the voltage of the first output terminal OUT1 may drop slightly (not shown in FIG. 5). However, compared with the discharge speed of the second capacitor C2, the discharge speed of the first capacitor C1 is slow. Since the second clock signal CLKB is at the low level and the second output terminal OUT2 is floated, the voltage of the second output terminal OUT2 is quickly pulled down to the ground and changed to the low level. After the voltage of the second output terminal OUT2 is quickly pulled to the ground, the first NMOS transistor N1 is turned off, the discharging of the charge of the first capacitor C1 stops, and the supply voltage VDD continues to charge the first capacitor C1, and thus the voltage of the first output terminal OUT1 is pulled up to the supply voltage VDD. Therefore, when the first clock signal CLKA is at the high level, the second clock signal CLKB is at the low level, and the laser fault injection attack occurs, the voltage of the first output terminal OUT1 is at the high level and the voltage of the second output terminal OUT2 is at the low level. After the laser fault injection attack ends, the voltage of the second output terminal OUT2 is maintained at the low level. When the second clock signal CLKB flips to the high level, the second switch S2 is turned on, the supply voltage VDD is connected to the second capacitor C2, the power supply charges the second capacitor C2, and the voltage of the second output terminal OUT2 is pulled up to the supply voltage VDD again and changed to the high level.

FIG. 6 shows the working timing diagram of the detection unit with an example in which the laser fault injection attack occurs when the first clock signal CLKA is at the low level and the second clock signal CLKB is at the high level.

The working principle is similar to that in FIG. 5. The laser fault injection attack occurs when the first clock signal CLKA is at the low level and the second clock signal CLKB is at the high level. The voltage of the first output terminal OUT1 is pulled down to the ground and changed to the low level. When the current by which the power supply charges the second capacitor C2 is greater than the current by which the second capacitor C2 is discharged, the voltage of the second output terminal OUT2 may drop slightly, but it is always close to or equal to the supply voltage VDD, that is, the high level. After the laser fault injection attack ends, the voltage of the first output terminal OUT1 is maintained at the low level. When the first clock signal CLKA flips to the high level, the first switch S1 is turned on, the supply voltage VDD is connected to the first capacitor C1, the power supply charges the first capacitor C1, and the voltage of the first output terminal OUT1 is pulled up to the supply voltage VDD again and changed to the high level.

Based on FIG. 5 and FIG. 6, no matter whether the first clock signal is at the high level and the second clock signal is at the low level, or the first clock signal is at the low level and the second clock signal is at the high level, the detection circuit for the laser fault injection attack in the embodiment of the present disclosure can effectively detect laser fault injection attacks on the chip, ensuring the robustness and security of the chip.

In an embodiment, for the detection circuit for the laser fault injection attack shown in FIG. 1, the first switch S1 can be implemented by an inverter and a positive channel metal oxide semiconductor (PMOS) transistor. As shown in a part 71 in FIG. 7, the first switch S1 includes a first inverter NO1 and a first PMOS transistor P1. An input terminal of the first inverter NO1 serves as the control terminal of the first switch S1, and is configured to be connected to the first input terminal IN11 of the detection unit 10 to receive the first clock signal CLKA. An output terminal of the first inverter NO1 is connected to a gate of the first PMOS transistor P1. A drain of the first PMOS transistor P1 serves as the first terminal of the first switch S1 and is configured to be connected to the supply voltage VDD. A source of the first PMOS transistor P1 serves as the second terminal of the first switch S1 and configured to be connected to the drain of the first NMOS transistor N1 and the gate of the second NMOS transistor N2, and is further configured to be connected to the ground GND though the first capacitor C1. The source of the first PMOS transistor P1 also serves as the first output terminal OUT1 of the detection unit 10.

In an embodiment, for the detection circuit for the laser fault injection attack shown in FIG. 1, the second switch S2 can be implemented by an inverter and a PMOS transistor. As shown in a part 72 in FIG. 7, the second switch S2 includes a second inverter NO2 and a second PMOS transistor P2. An input terminal of the second inverter NO2 serves as the control terminal of the second switch S2, and is configured to be connected to the second input terminal IN12 of the detection unit 10 to receive the second clock signal CLKB. An output terminal of the second inverter NO2 is connected to a gate of the second PMOS transistor P2. A drain of the second PMOS transistor P2 serves as the first terminal of the second switch S2 and is configured to be connected to the supply voltage VDD. A source of the second PMOS transistor P2 serves as the second terminal of the second switch S2 and configured to be connected to the drain of the second NMOS transistor N2 and the gate of the first NMOS transistor N1, and is further configured to be connected to the ground GND though the second capacitor C2. The source of the second PMOS transistor P2 also serves as the second output terminal OUT2 of the detection unit 10.

Figure 7:
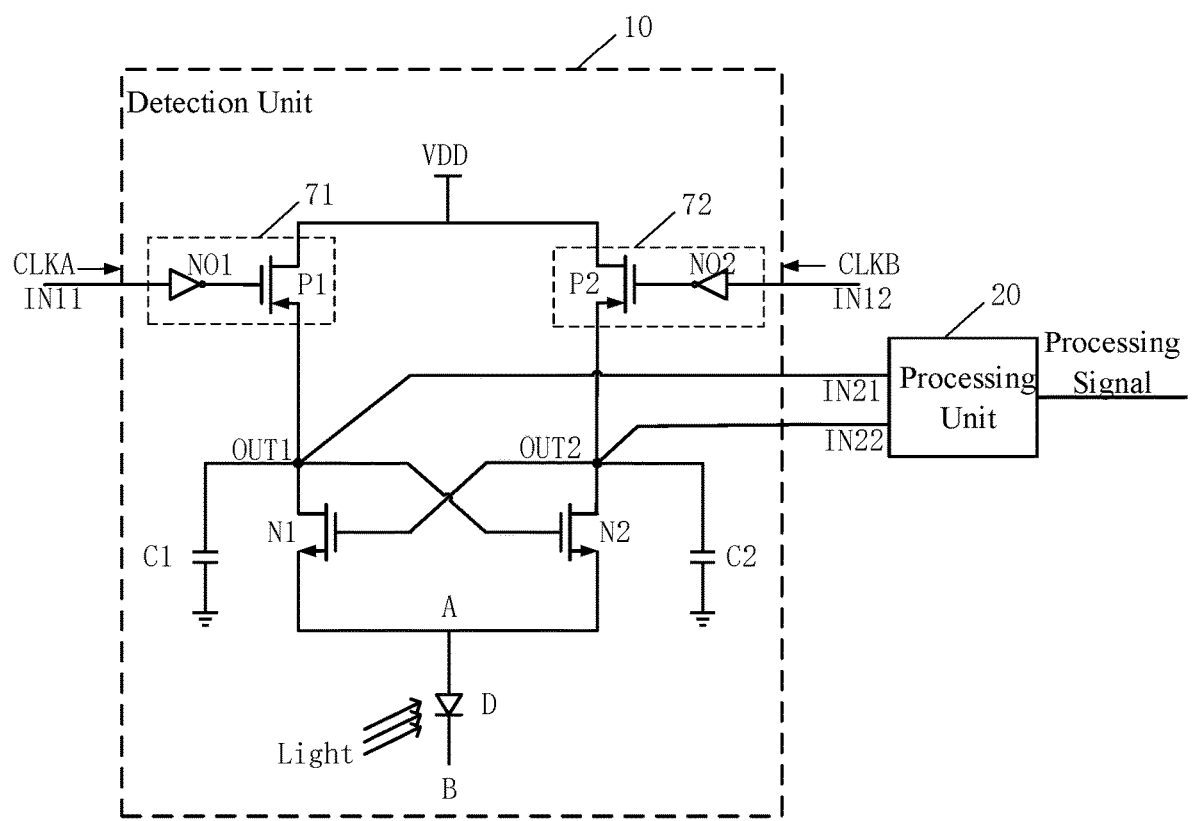
FIG. 7 is a structural diagram of a detection circuit for a laser fault injection attack according to another embodiment of the present disclosure.

For the working principle of the detection circuit for the laser fault injection attack shown in FIG. 7, reference can be made to the related description of FIG. 1, and will not be repeated herein.

Different from the control logic of the turning-on and turning-off states of the first switch S1 by the first clock signal CLKA and the control logic of the turning-on and turning-off states of the second switch S2 by the second clock signal CLKB in the detection circuit for the laser fault injection attack shown in FIG. 1, in another embodiment, the control logic of the turning-on and turning-off states of the first switch S1 by the first clock signal CLKA is as follows. When the first clock signal CLKA is at the high level, the first switch S1 is turned off; and when the first clock signal CLKA is at the low level, the first switch S1 is turned on. The control logic of the turning-on and turning-off states of the second switch S2 by the second clock signal CLKB is as follows. When the second clock signal CLKB is at the high level, the second switch S2 is turned off; and when the second clock signal CLKB is at the low level, the second switch S2 is turned on.

In an embodiment, the first switch S1 of the detection circuit for the laser fault injection attack in the present embodiment can be implemented by a PMOS transistor. As shown in a part 81 in FIG. 8, the first switch S1 includes a third PMOS transistor P3. A gate of the third PMOS transistor P3 is the control terminal of the first switch S1, and is configured to be connected to the first input terminal IN11 of the detection unit 10 to receive the first clock signal CLKA. A drain of the third PMOS transistor P3 serves as the first terminal of the first switch S1, and is configured to be connected to the supply voltage VDD. A source of the third PMOS transistor P3 serves as the second terminal of the first switch S1, and is configured to be connected to the drain of the first NMOS transistor N1 and the gate of the second NMOS transistor N2. The source of the third PMOS transistor P3 is further configured to be connected to the ground GND through the first capacitor C1, and also serves as the first output terminal OUT1 of the detection unit 10.

In an embodiment, for the detection circuit for the laser fault injection attack shown in FIG. 1, the second switch S2 can be implemented by a PMOS transistor. As shown in a part 82 in FIG. 8, the second switch S2 includes a fourth PMOS transistor P4. A gate of the fourth PMOS transistor P4 serves as the control terminal of the second switch S2, and is configured to be connected to the second input terminal IN12 of the detection unit 10 to receive the second clock signal CLKB. A drain of the fourth PMOS transistor P4 serves as the first terminal of the second switch S2, and is configured to be connected to the supply voltage VDD. A source of the fourth PMOS transistor P4 serves as the second terminal of the second switch S2, and is configured to be connected to the drain of the second NMOS transistor N2 and the gate of the first NMOS transistor N1. The source of the fourth PMOS transistor P4 is further configured to be connected to the ground GND through the second capacitor C2, and also serves as the second output terminal OUT2 of the detection unit 10.

For the working principle of the detection circuit for the laser fault injection attack in the present embodiment, reference can be made to the working principle of the laser fault injection attack detection circuit shown in FIG. 1, and will not be repeated herein.

Different from the control logic of the turning-on and turning-off states of the first switch S1 by the first clock signal CLKA and the control logic of the turning-on and turning-off states of the second switch S2 by the second clock signal CLKB in the detection circuit for the laser fault injection attack shown in FIG. 1, in another embodiment, the control logic of the turning-on and turning-off states of the first switch S1 by the first clock signal CLKA is as follows. When the first clock signal CLKA is at the high level, the first switch S1 is turned off; and when the first clock signal CLKA is at the low level, the first switch S1 is turned on. The control logic of the turning-on and turning-off states of the second switch S2 by the second clock signal CLKB is as follows. When the second clock signal CLKB is at the low level, the second switch S2 is turned off; and when the second clock signal CLKB is at the high level, the second switch S2 is turned on.

Figure 8:
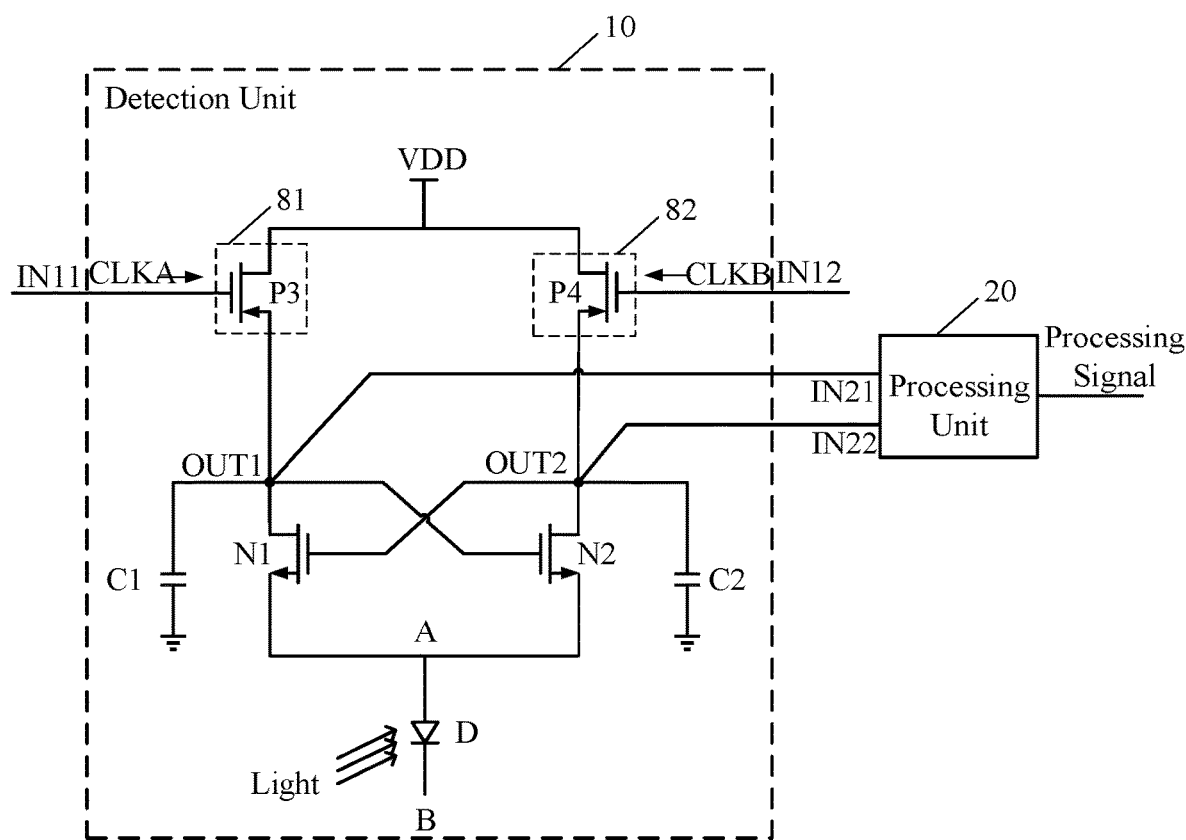
FIG. 8 is a structural diagram of a detection circuit for a laser fault injection attack according to yet another embodiment of the present disclosure.

In an embodiment, the first switch S1 can be implemented by a PMOS transistor, for example, as shown in the part 81 in FIG. 8; and the second switch S2 can be implemented by an inverter and a PMOS transistor, for example, as shown in the part 72 in FIG. 7.

For the working principle of the detection circuit for the laser fault injection attack in the present embodiment, reference can be made to the working principle of the laser fault injection attack detection circuit shown in FIG. 1, and will not be repeated herein.

Different from the control logic of the turning-on and turning-off states of the first switch S1 by the first clock signal CLKA and the control logic of the turning-on and turning-off states of the second switch S2 by the second clock signal CLKB in the laser fault injection attack detection circuit shown in FIG. 1, in another embodiment, the control logic of the turning-on and turning-off states of the first switch S1 by the first clock signal CLKA is as follows. When the first clock signal CLKA is at the low level, the first switch S1 is turned off; and when the first clock signal CLKA is at the high level, the first switch S1 is turned on. The control logic of the turning-on and turning-off states of the second switch S2 by the second clock signal CLKB is as follows. When the second clock signal CLKB is at the high level, the second switch S2 is turned off; and when the second clock signal CLKB is at the low level, the second switch S2 is turned on.

In an embodiment, the first switch S1 can be implemented by an inverter and a PMOS transistor, for example, as shown in the part 71 in FIG. 7; and the second switch S2 can be implemented by a PMOS transistor, for example, as shown in the part 82 in FIG. 8.

For the working principle of the detection circuit for the laser fault injection attack in the present embodiment, reference can be made to the working principle of the detection circuit for the laser fault injection attack shown in FIG. 1, and will not be repeated herein.

Figure 9:
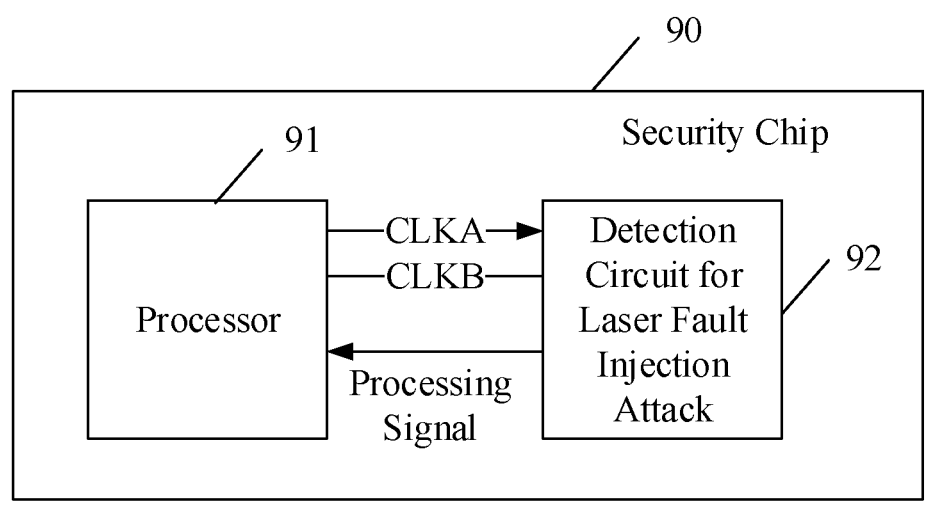
FIG. 9 is a structural diagram of a security chip according to an embodiment of the present disclosure.

The detection circuit for the laser fault injection attack in the present disclosure can be applied to any chip, such as a security chip. FIG. 9 is a structural diagram of a security chip according to an embodiment of the present disclosure. As shown in FIG. 9, a security chip 90 can include a processor 91 and a detection circuit 92 for the laser fault injection attack in embodiments of the present disclosure.

The processor 91 can output the first clock signal CLKA and the second clock signal CLKB to the detection circuit 92 for the laser fault injection attack. When the detection circuit 92 for the laser fault injection attack detects that the security chip 90 is under laser fault injection attack, the detection circuit 92 for the laser fault injection attack outputs a processing signal to the processor 91. The processor 91 performs corresponding processing based on the processing signal, such as interrupt or chip reset. The subsequent processing performed by the processor 91 based on the processing signal is not limited in the embodiments of the present disclosure.

Figure 10:
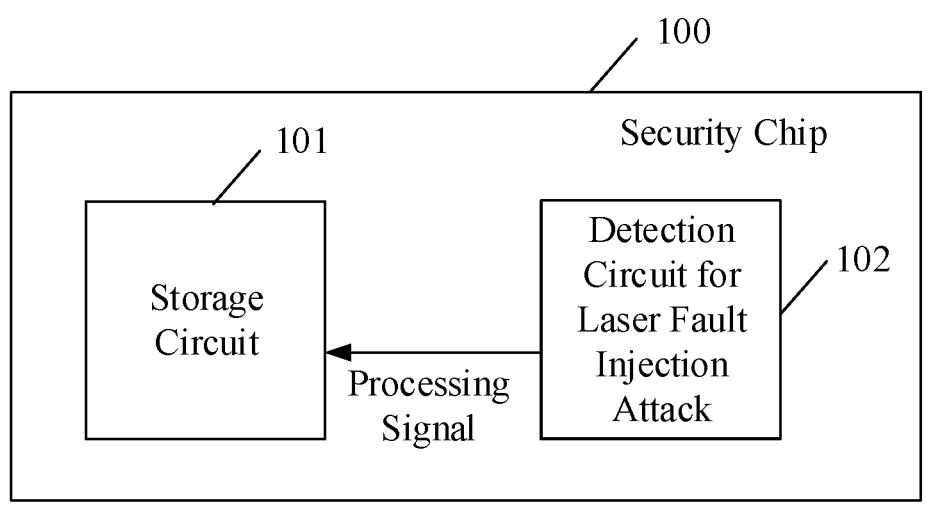
FIG. 10 is a structural diagram of a security chip according to another embodiment of the present disclosure.

FIG. 10 is a structural diagram of a security chip according to another embodiment of the present disclosure. As shown in FIG. 10, a security chip 100 can include a detection circuit 101 for a laser fault injection attack and a storage circuit 102. The first voltage signal and the second voltage signal outputted by the detection circuit 101 for the laser fault injection attack are configured to control removal of contents of the storage circuit 102.

In an embodiment, the first clock signal CLKA and the second clock signal CLKB can be sent to the detection circuit for the laser fault injection attack by a processor of the security chip.

In the embodiments of this disclosure, "at least one" means one or more, and "a plurality of" means two or more. The term "and/or" describes an association relationship for describing associated objects and represents existence of three relationships. For example, A and/or B may represent the following three cases: A alone, both A and B, and B alone, where A and B can be in a singular or plural form. The character "/" usually indicates an "or" relationship between the associated objects. "At least one of the following" or a similar expression thereof means any combination of these items, including a singular item or any combination of a plurality of items. For example, at least one of a, b, or c may indicate: a, b, c, a and b, a and c, b and c, or a, b, and c, where a, b, and c may be in a singular or plural form.

A person of ordinary skill in the art can be aware that the units and algorithm operations described in the embodiments disclosed in this specification can be implemented by electronic hardware or a combination of computer software and electronic hardware. Whether the functions are performed by hardware or software depends on particular disclosures and design constraint conditions of the technical solutions. A person skilled in the art may use different methods to implement the described functions for each particular disclosure, but it should not be considered that the implementation goes beyond the scope of this disclosure.

It can be clearly understood by a person skilled in the art that, for the purpose of convenient and brief description, for a detailed working process of the foregoing system, apparatuses, and units, refer to a corresponding process in the foregoing method embodiments.

When the functions are implemented in a form of a software functional unit and sold or used as an independent product, the functions can be stored in a computer-readable storage medium. Based on such understanding, the technical solutions of this disclosure essentially, or the part contributing to the related art, or some of the technical solutions can be implemented in a form of a software product. The software product is stored in a storage medium and includes several instructions for instructing a computer device (which can be a personal computer, a server, or a network device, or the like) to perform all or some of the operations of the methods described in the embodiments of this disclosure. The foregoing storage medium includes any medium that can store program code, such as a USB flash drive, a removable hard disk, a read-only memory (ROM), a random access memory (RAM), a magnetic disk, an optical disc, or the like.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A detection circuit for a laser fault injection attack on a chip, being disposed in the chip and comprising:
   a first capacitor;
   a second capacitor;
   a first switch, wherein the first switch comprises a control terminal configured to receive a first clock signal for controlling a turning-on state and a turning-off state of the first switch, a first terminal connected to a supply voltage, and a second terminal grounded through the first capacitor;
   a second switch, wherein the second switch comprises a control terminal configured to receive a second clock signal for controlling a turning-on state and a turning-off state of the second switch, a first terminal connected to the supply voltage, and a second terminal grounded through the second capacitor;
   a photosensitive element;
   a first NMOS transistor, wherein the first NMOS transistor comprises a drain connected to the second terminal of the first switch and configured to output a first voltage signal, a source connected to the photosensitive element, and a gate connected to the second terminal of the second switch; and
   a second NMOS transistor, wherein the second NMOS transistor comprises a drain connected to the second terminal of the second switch and configured to output a second voltage signal, a source connected to the photosensitive element, and a gate connected to the second terminal of the first switch; and the first voltage signal and the second voltage signal are configured to indicate the chip is attacked by laser fault injection.

2. The detection circuit according to claim 1, wherein the first clock signal and the second clock signal have a same frequency and a same phase.

3. The detection circuit according to claim 1, wherein the first clock signal and the second clock signal have opposite phases.

4. The detection circuit according to claim 1, wherein the first switch is turned on when the first clock signal is at a high level, and is turned off when the clock signal is at a low level; and the second switch is turned on when the second clock signal is at a high level, and is turned off when the second clock signal is at a low level.

5. The detection circuit according to claim 4, wherein the first switch comprises a first inverter and a first PMOS transistor, wherein the first PMOS transistor comprises a gate, a drain serving as the first terminal of the first switch, and a source serving as the second terminal of the first switch; and the first inverter comprises an input terminal serving as the control terminal of the first switch, and an output terminal connected to the gate of the first PMOS transistor.

6. The detection circuit according to claim 4, wherein second switch comprises a second inverter and a second PMOS transistor, wherein the second PMOS transistor comprises a gate, a drain serving as the first terminal of the second switch, and a source serving as the second terminal of the second switch; and the second inverter comprises an input terminal serving as the control terminal of the second switch, and an output terminal connected to the gate of the second PMOS transistor.

7. The detection circuit according to claim 1, wherein the first switch is turned on when the first clock signal is at a low level, and is turned off when the first clock signal is at a high level; and the second switch is turned on when the second clock signal is at a low level, and is turned off when the second clock signal is at a high level.

8. The detection circuit according to claim 7, wherein the first switch comprises a third PMOS transistor, wherein the third PMOS transistor comprises a gate serving as the control terminal of the first switch, a drain serving as the first terminal of the first switch, and a source serving as the second terminal of the first switch.

9. The detection circuit according to claim 7, wherein the second switch comprises a fourth PMOS transistor, wherein the fourth PMOS transistor comprises a gate serving as the control terminal of the second switch, a drain serving as the first terminal of the second switch, and a source serving as the second terminal of the second switch.

10. The detection circuit according to claim 1, wherein the first switch is turned on when the first clock signal is at a low level, and is turned off when the first clock signal is at a high level; and the second switch is turned on when the second clock signal is at a high level, and is turned off when the second clock signal is at a low level.

11. The detection circuit according to claim 10, wherein the first switch comprises a third PMOS transistor, wherein the third PMOS transistor comprises a gate serving as the control terminal of the first switch, a drain serving as the first terminal of the first switch, and a source serving as the second terminal of the first switch.

12. The detection circuit according to claim 10, wherein the second switch comprises a second inverter and a second PMOS transistor, wherein the second PMOS transistor comprises a gate, a drain serving as the first terminal of the second switch, and a source serving as the second terminal of the second switch; and the second inverter comprises an input terminal serving as the control terminal of the second switch, an output terminal connected to the gate of the second PMOS transistor.

13. The detection circuit according to claim 3, wherein the first switch is turned on when the first clock signal is at a high level, and is turned off when the first clock signal is at a low level; and the second switch is turned on when the second clock signal is at a low level, and is turned off when the second clock signal is at a high level.

14. The detection circuit according to claim 13, wherein the first switch comprises a first inverter and a first PMOS transistor, wherein the first PMOS transistor comprises a gate, a drain serving as the first terminal of the first switch, and a source serving as the second terminal of the first switch; and the first inverter comprises an input terminal serving as the control terminal of the first switch, and an output terminal connected to the gate of the first PMOS transistor.

15. The detection circuit according to claim 13, wherein the second switch comprises:
a fourth PMOS transistor, comprising a gate serving as the control terminal of the second switch, a drain serving as the first terminal of the second switch, and a source serving as the second terminal of the second switch.

16. The detection circuit according to claim 3, wherein the photosensitive element is a photodiode.

17. The detection circuit according to claim 1, further comprising:
a signal processing circuit, configured to output a processing signal based on the first voltage signal and the second voltage signal, wherein the processing signal is configured to control states of other circuits in the chip.

18. A security chip, comprising:
a detection circuit for a laser fault injection attack on a chip, wherein the detection circuit is disposed in the chip and comprises:
a first capacitor;
a second capacitor;
a first switch, wherein the first switch comprises a control terminal configured to receive a first clock signal for controlling a turning-on state and a turning-off state of the first switch, a first terminal connected to a supply voltage, and a second terminal grounded through the first capacitor;
a second switch, wherein the second switch comprises a control terminal configured to receive a second clock signal for controlling a turning-on state and a turning-off state of the second switch, a first terminal connected to the supply voltage, and a second terminal grounded through the second capacitor;
a photosensitive element;
a first NMOS transistor, wherein the first NMOS transistor comprises a drain connected to the second terminal of the first switch and configured to output a first voltage signal, a source connected to the photosensitive element, and a gate connected to the second terminal of the second switch; and
a second NMOS transistor, wherein the second NMOS transistor comprises a drain connected to the second terminal of the second switch and configured to output a second voltage signal, a source connected to the photosensitive element, and a gate connected to the second terminal of the first switch; and the first voltage signal and the second voltage signal are configured to indicate the chip is attacked by laser fault injection; and a storage circuit, wherein the first voltage signal and the second voltage signal are configured to control removal of contents of the storage circuit.

19. The security chip according to claim 18, wherein the first clock signal and the second clock signal have a same frequency and a same phase.

20. The security chip according to claim 18, wherein the first clock signal and the second clock signal have opposite phases.

\* \* \* \* \*